US009740909B2

(12) United States Patent
Pierce et al.

(10) Patent No.: US 9,740,909 B2
(45) Date of Patent: *Aug. 22, 2017

(54) ELECTRONIC DEVICE WITH A FINGERPRINT READER AND METHOD FOR OPERATING THE SAME

(71) Applicant: Google Technology Holdings LLC, Mountain View, CA (US)

(72) Inventors: Amber M. Pierce, Evanston, IL (US); Michael J Lombardi, Lake Zurich, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/368,785

(22) Filed: Dec. 5, 2016

(65) Prior Publication Data

US 2017/0083743 A1    Mar. 23, 2017

Related U.S. Application Data

(63) Continuation of application No. 14/185,343, filed on Feb. 20, 2014, now Pat. No. 9,536,130.

(60) Provisional application No. 61/921,828, filed on Dec. 30, 2013.

(51) Int. Cl.
*G06K 9/00* (2006.01)

(52) U.S. Cl.
CPC ..... *G06K 9/00013* (2013.01); *G06K 9/00067* (2013.01); *G06K 9/00087* (2013.01)

(58) Field of Classification Search
CPC ........... G06K 9/00013; G06K 9/00067; G06K 9/00087

USPC .......................................................... 382/124
See application file for complete search history.

(56) References Cited

U.S. PATENT DOCUMENTS

| 2006/0239517 | A1 | 10/2006 | Creasey et al. |
| 2008/0165144 | A1* | 7/2008 | Forstall ................. G06F 1/1626 345/173 |
| 2012/0276947 | A1 | 11/2012 | Smith |
| 2014/0003683 | A1 | 1/2014 | Vieta et al. |
| 2015/0049926 | A1 | 2/2015 | Heilpern |
| 2015/0135108 | A1* | 5/2015 | Pope .................. G06K 9/00006 715/767 |
| 2015/0186706 | A1 | 7/2015 | Pierce et al. |

FOREIGN PATENT DOCUMENTS

| JP | 2006072872 A | * | 3/2006 |
| WO | 2013173838 A2 | | 11/2013 |
| WO | WO 2013173838 A2 | * | 11/2013 ......... G06K 9/00006 |

OTHER PUBLICATIONS

Prosecution History from U.S. Appl. No. 14/185,343, dated Nov. 13, 2011 through Aug. 26, 2016, 44 pp.

* cited by examiner

*Primary Examiner* — Amandeep Saini
(74) *Attorney, Agent, or Firm* — Shumaker & Sieffert, P.A.

(57) ABSTRACT

A method for operating an electronic device is provided, in which the device detects contact with a user's finger, scans its fingerprint and sets the orientation of the electronic device based on the fingerprint (e.g., whether is from the user's left hand or right hand) and on an angle of the fingerprint with respect to the device. This allows the electronic device to determine its orientation with respect to the user rather than with respect to the environment.

16 Claims, 7 Drawing Sheets

ELECTRONIC DEVICE WITH A FINGERPRINT READER AND METHOD FOR OPERATING THE SAME

RELATED APPLICATIONS

This application is a continuation of U.S. application Ser. No. 14/185,343, filed Feb. 20, 2014, which claims the benefit of U.S. Provisional Application No. 61/921,828, filed Dec. 30, 2013, the entire contents of each of which are hereby incorporated by reference.

TECHNICAL FIELD

The present disclosure relates to touch control of electronic devices and, more particularly, operating such devices based on inputs from fingerprint readers.

BACKGROUND

Touch sensors have been used in electronic devices for many years, but mostly in conjunction with a display screen, often called a "touch screen." The use of touch sensors in the body of the device is not as common and is typically limited to determining whether the device is being touched. The recent addition of fingerprint readers will likely spur the use of touch sensors in general, and create additional opportunities to add functionality to these devices.

DRAWINGS

While the appended claims set forth the features of the present techniques with particularity, these techniques may be best understood from the following detailed description taken in conjunction with the accompanying drawings of which:

DESCRIPTION

Traditionally, most electronic devices have some notion of a "top" and a "bottom." Operating such a device often requires that its top end be oriented upward and its bottom end to be oriented downward. For example, electronic communication devices such as smartphones have a speaker at one end, where the user's ear will be, and a microphone at the other end, where the user's mouth will be. Making electronic devices symmetrical—i.e., having a microphone and a speaker on each end—has benefits, however. Symmetrical devices are aesthetically pleasing and easier for consumers to use. For example, a user can pick up a symmetrical electronic device (e.g., to answer a call) and use it immediately, without regard to which end is oriented upward and which end is oriented downward.

For a symmetrical communication device to be practical, it needs some way to detect orientation. Typically, this is accomplished through the use of an accelerometer. However, reliably detecting a device's orientation relative to a user is difficult to accomplish with an accelerometer alone. Accelerometers can detect a device's orientation relative to the environment (e.g., the earth), but in many cases users interact with devices in positions that prevent the accelerometer knowing whether the device is being held by a user with the top end up or the bottom end up (e.g., if the user is lying in bed, lying on a couch, bending over, or leaning forward in a chair reading).

In accordance with various embodiments, a method for operating an electronic device is provided, in which the electronic device detects contact with a user's finger (e.g., using a touch sensor), scans a fingerprint, and sets the orientation of the electronic device based on the fingerprint (e.g., whether is from the user's left hand or right hand) and on an angle of the fingerprint with respect to the device. This allows the electronic device to determine its own orientation with respect to the user rather than with respect to the environment.

In one embodiment, the electronic device has a fingerprint reader ("FPR") substantially centered on the rear of the electronic device. By using finger detection and finger angle, the electronic device is able to determine its own orientation and position its user interface ("UI") accordingly. Further, because the FPR needs to authenticate the user to unlock the device, the orientation can be correctly established before the UI is displayed to the user. In addition to orienting the display, the orientation information can be used to drive other behaviors of the electronic device, including earpiece assignment, speaker assignment, microphone behavior, selecting of proximity sensors that are to be engaged, setting the volume up and down functions of a volume control, and altering the usage of antennas of the device (such as changing which antenna is the main antenna and which antenna is a diversity antenna).

According to an embodiment, when a user holds the electronic device and keeps a finger on the FPR, input from the FPR overrides data from the electronic device's accelerometer so that the user can make the electronic device maintain its behavioral orientation event when the device's physical orientation changes. Additionally, the electronic device can rely exclusively on data from the FPR in cases where data from the accelerometer is ambiguous—e.g., when the electronic device is flat in the user's hand, horizontal to the ground.

In some embodiments, the electronic device stores the "last" orientation of the UI each time the device sleeps, and when external events like incoming calls or notifications occur, the electronic device displays the UI using the stored orientation.

According to various embodiments of the disclosure, the electronic device has a sensor that detects contact of a finger on the electronic device, a fingerprint reader that scans a fingerprint of the finger, and a processor that sets the orientation of the electronic device based on the fingerprint and on an angle of the fingerprint with respect to the device. The processor may maintain the orientation of the electronic device based on the fingerprint and on the angle of the fingerprint with respect to the device until contact of the finger with the electronic device ceases. In some embodiments, the sensor which detects contact of a finger on the device may be the fingerprint reader itself.

Figure 1A:
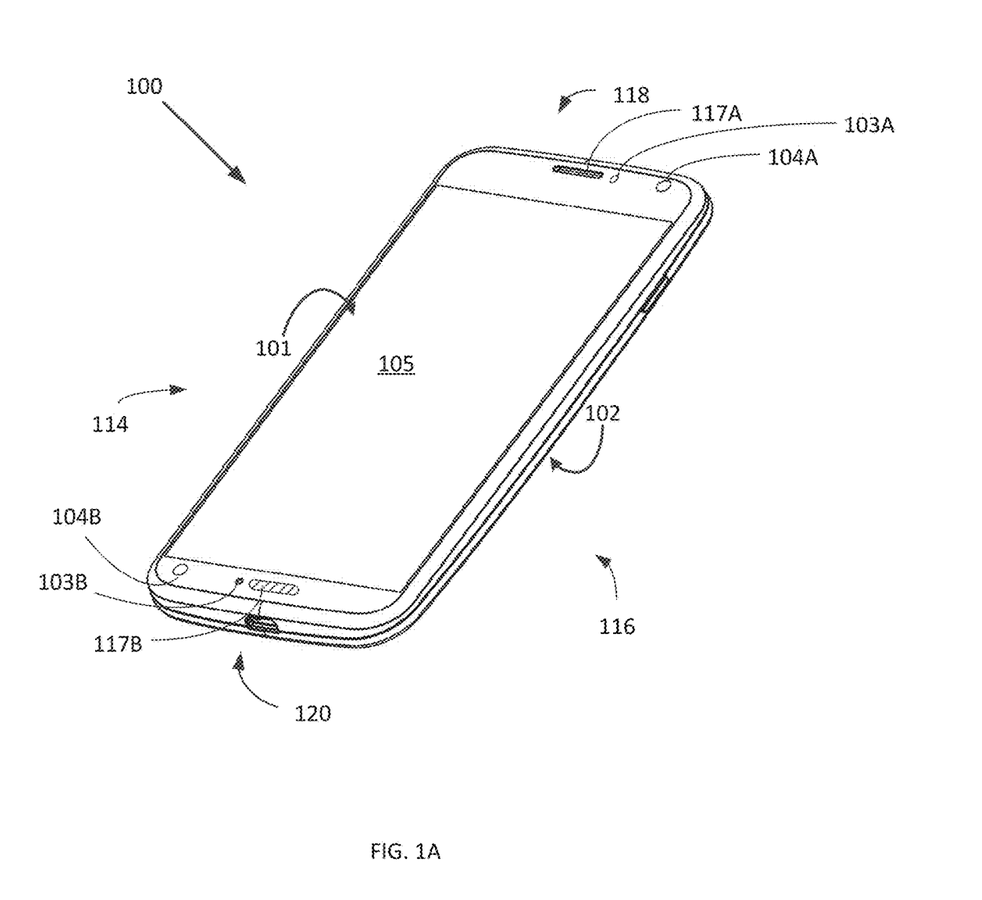
FIGS. 1A and 1B depict an electronic device according to an embodiment.
Figure 1B:
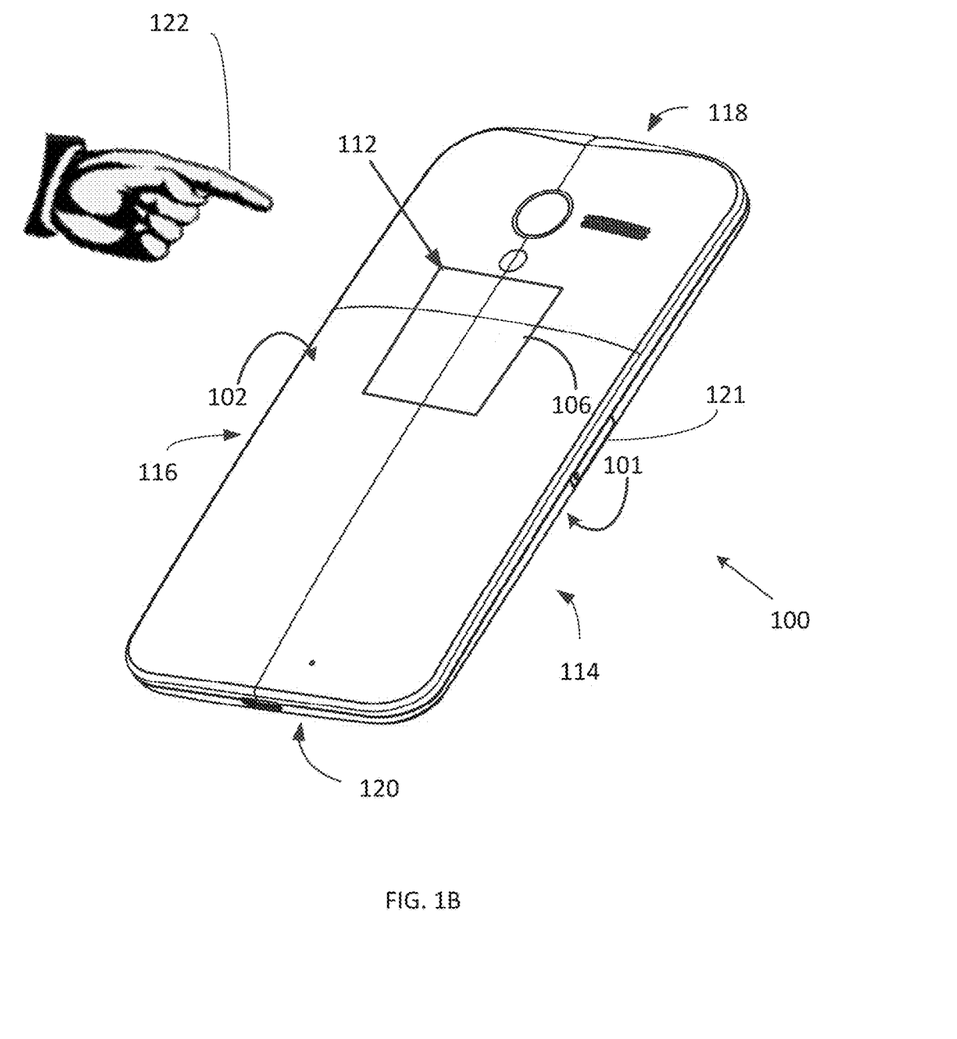

Turning to FIG. 1A, an embodiment of the electronic device 100 has a front face 101, which includes a first microphone 103A, a second microphone 103B, a first proximity sensor 104A, a second proximity sensor 104B, a touch screen display 105, a first speaker 117A, and second speaker 117B. The first and second speakers 117A and 117B may serve as earpieces or as loudspeakers. Turning to FIG. 1B, The electronic device 100 also has a rear face 102. Located on the rear face 102 is an FPR 106. Possible implementations of the electronic device 100 include a cell phone, portable music player, and game console. The electronic device 100 also has a left side 114, a right side 116, a top end 118, and a bottom end 120. The electronic device further has a volume control 121.

Figure 2:
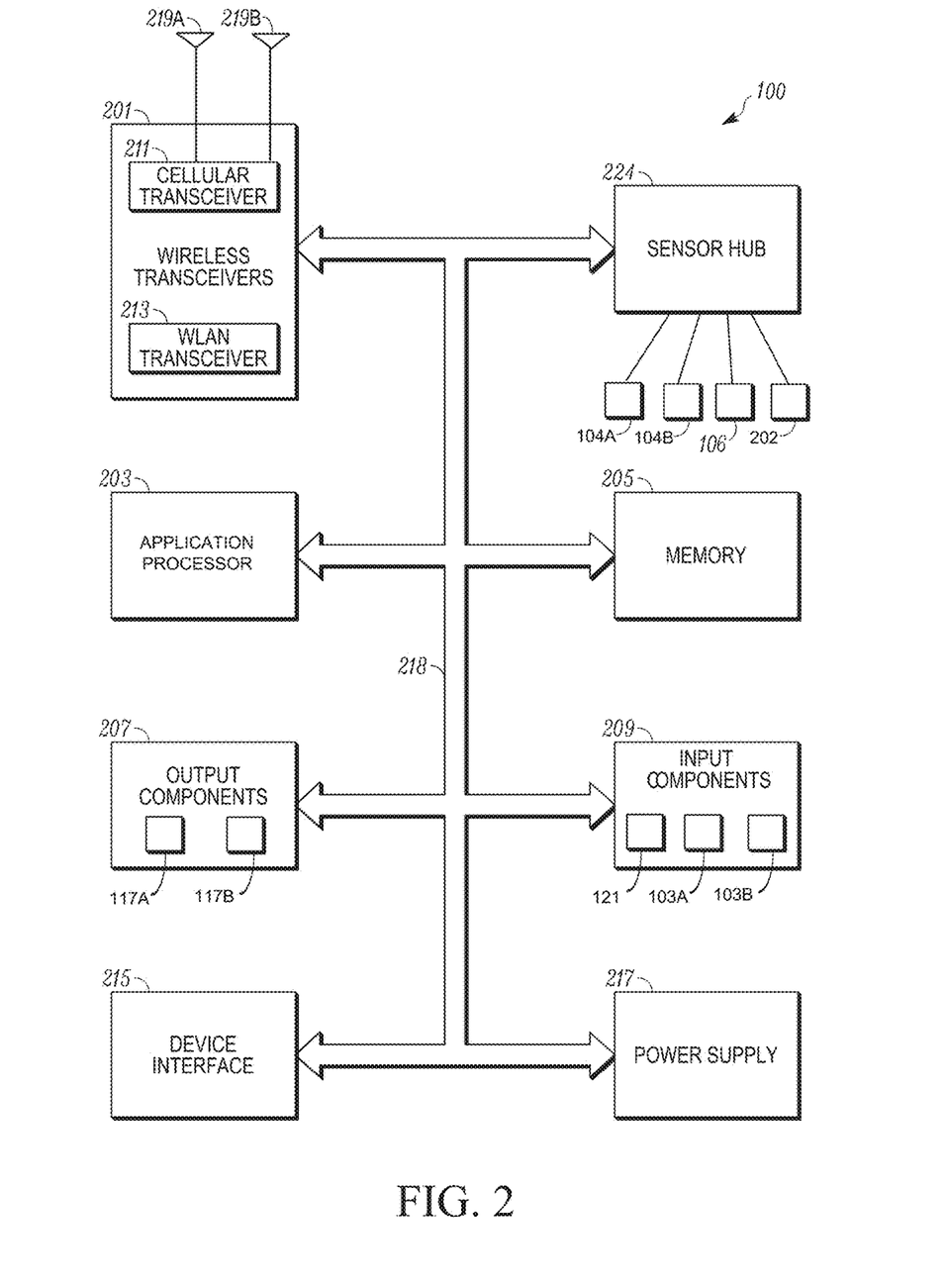
FIG. 2 shows example components of the electronic device of FIGS. 1A and 1B.

Turning to FIG. 2, the electronic device 100 further includes one or more wireless transceivers 201, an accelerometer 202, an application processor 203, a memory 205, one or more output components 207, and one or more input components 209. The FPR 106 (FIG. 1B) (which functions as a touch sensor), accelerometer 202, first proximity sensor 104A (FIG. 1A), and second proximity sensor 104B (FIG. 1A) are electrically coupled to a sensor hub 224. Other sensors, such as a separate touch sensor, may also be electrically coupled to the sensor hub. The sensor hub 224 may be implemented as a low-power processor (i.e., a processor that consumes less power than the application processor 203). The term "processor" may refer to either the sensor hub 224 or to the application processor 203. Possible implementations of the application processor 203 and the sensor hub 224 include a microprocessor, microcomputer, and application-specific integrated circuit. The application processor 203 executes instructions retrieved from the memory 205. The methods described herein may be carried out under control of the application processor 203, the sensor hub 224, or both, according to computer executable instructions stored, for example, in the memory 205.

Among the input components 209 are the first microphone 103A (FIG. 1A), the second microphone 103B (FIG. 1A), and the volume control 121 (FIG. 1B). Other components of the electronic device 100 include a device interface 215 and a power supply 217. The components depicted in FIG. 2 are coupled directly or indirectly with one another by one or more communication links 218 (e.g., an internal communication bus). The wireless transceivers 201 include a cellular transceiver 211 and a wireless local area network ("WLAN") transceiver 213. The electronic device 100 further includes a first antenna 219A and a second antenna 219B, both of which are coupled to the cellular transceiver 211.

The accelerometer 202 senses movement of the electronic device and transmits data regarding the movement to the sensor hub 224. In one embodiment, when the sensor hub 224 receives acceleration data indicating movement from the accelerometer 202, the sensor hub wakes up the FPR 106. At that point, an icon appears on the display 105 informing the user that authentication is required (i.e., in order to use the electronic device).

It is to be understood that FIG. 2 is provided for illustrative purposes only, and is not intended to be a complete schematic diagram of the various components required for an electronic device.

Figure 3A:
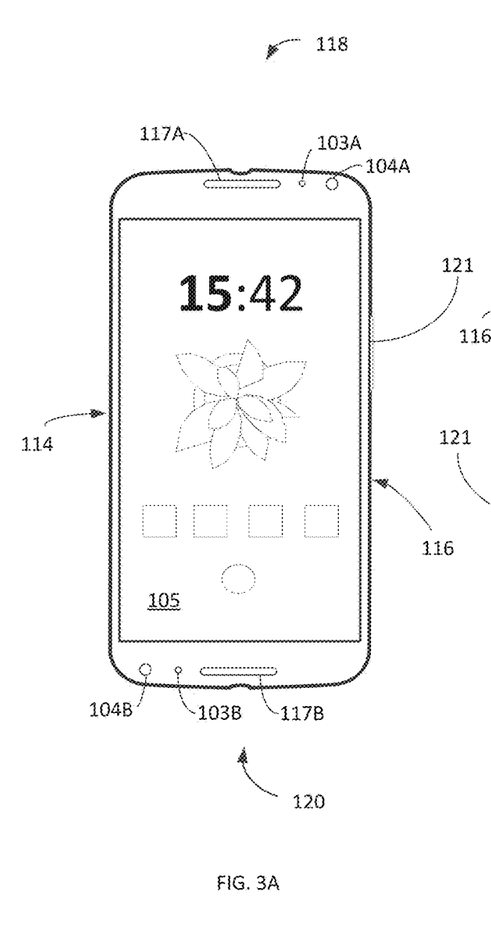
FIGS. 3A and 3B are front views of the electronic device of FIGS. 1A and 1B according to an embodiment.
Figure 3B:
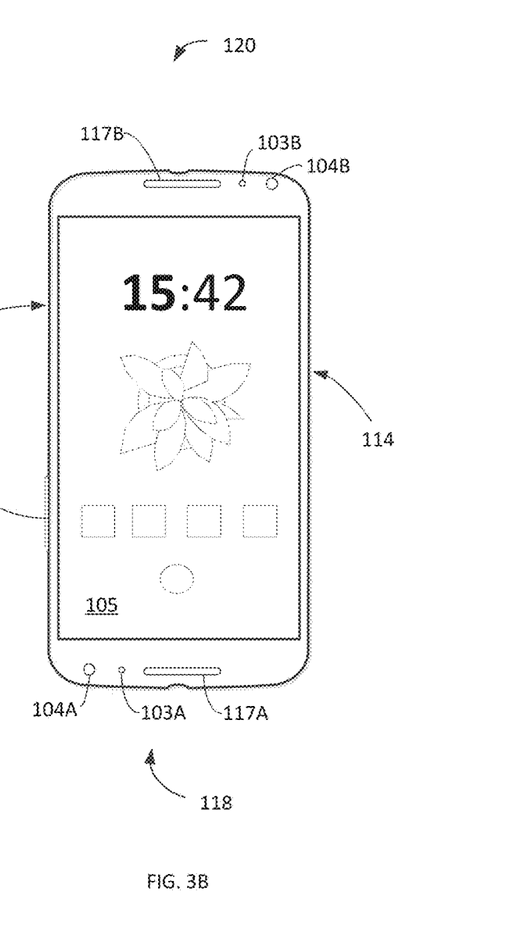

Turning to FIGS. 3A and 3B, the electronic device 100 has a first orientation (FIG. 3A), in which the top end 118 is above the bottom end 120 with respect to the user, or in which the top end 118 is farther away from the user than the bottom end 120. Conversely, the electronic device 100 has a second orientation (FIG. 3B), in which the top end 118 is below the bottom end 120 with respect to the user, or when the bottom end 118 is farther away from the user than the top end 120.

Turning back to FIG. 1B, during a set-up procedure for the electronic device 100 the user puts a finger 122 of his or her left hand (e.g., index finger) on the FPR 106 in response to a prompt that the electronic device 100 displays on the display 105. The FPR 106 then scans the fingerprint. The user receives the same prompt for the right hand and goes through the same procedure with his or her right hand. The FPR 106 stores the two fingerprints in memory.

According to an embodiment, when a user's finger 122 touches the FPR 106, the FPR 106 scans the user's fingerprint and compares the scanned fingerprint with fingerprints in its memory. If the user has previously carried out the setup procedure described above, then the FPR 106 will be able to match the fingerprint and not only be able to identify the user, but also determine which hand the finger is on. The FPR 106 also determines the angle at which the finger 122 is positioned on the FPR 106, and provides the right hand/left hand information and information regarding the angle at which the fingerprint oriented to the sensor hub 224 (FIG. 2), which may then provide the information to the application processor 203 (FIG. 2).

FIGS. 4A-4D illustrate how the sensor hub 224 (FIG. 2) or the application processor 203 (FIG. 2) interprets the right/left and angle information. FIGS. 4A-4D show different instances of a finger touching the FPR 106 (FIG. 1B). It can be seen that the fingerprint 402 occupies a position on the FPR 106 at a particular angle (denoted by the angles on the protractor 404) that corresponds to a range of positions on an imaginary clock 406.

Figure 4A:
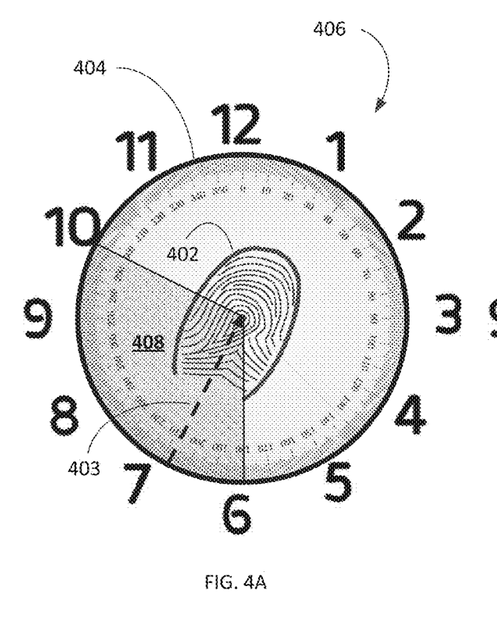
FIGS. 4A, 4B, 4C, and 4D show different angles at which a fingerprint can be sensed on the fingerprint reader shown in FIG. 1B in an embodiment.
Figure 4B:
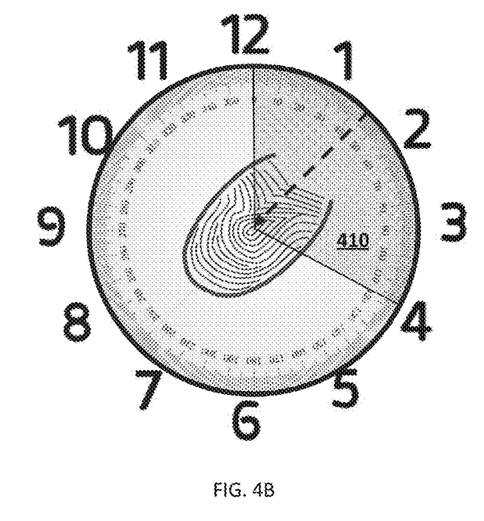
Figure 4C:
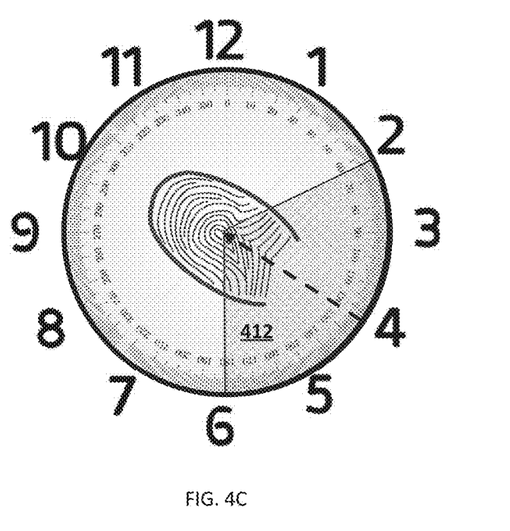
Figure 4D:
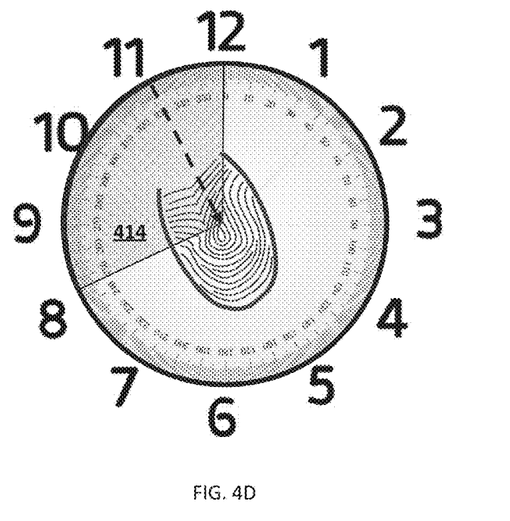

Referring back to FIG. 1B, the electronic device 100 (i.e., the sensor hub 224 or the application processor 203 of FIG. 2) interprets the information received from the FPR 106 according to the hand to which the fingerprint corresponds, and the range of angles into which the angle of orientation of the fingerprint falls. In some embodiments, the FPR 106 itself determines the orientation and provides this information to the sensor hub 224, which passes the information to the application processor 203. Referring to FIGS. 4A-4B, an example is as follows: (1) If, as shown in FIG. 4A, the fingerprint 402 is from a left hand, and the angle of its orientation is in a range 408 of angles from 6 o'clock to 10 o'clock, then the electronic device 100 determines that the top end 118 is pointing upward or away from the user. The electronic device 100 reacts by setting it's orientation to the first orientation (FIG. 3A). (2) If, as shown in FIG. 4B, the fingerprint is from a left hand, and the angle of its orientation is in a range 410 of angles from 12 o'clock to 4 o'clock, then the electronic device 100 determines that the bottom end 120 is pointing upward or away from the user. The electronic device 100 reacts by setting it's orientation to the second orientation (FIG. 3B). (3) If, as shown in FIG. 4C, the fingerprint is from a right hand, and the angle of its orientation is in a range 412 of angles from 2 o'clock to 6 o'clock, then the electronic device 100 determines that the top end 118 is pointing upward or away from the user. The electronic device 100 reacts by setting it's orientation to the first orientation (FIG. 3A). (4) If, as shown in FIG. 4D, the fingerprint is from a right hand, and the angle of its orientation is in a range 414 of angles from 8 o'clock to 12 o'clock, then the electronic device 100 determines that the bottom end 120 is pointing upward or away from the user. The electronic device 100 reacts by setting it's orientation to the second orientation (FIG. 3B).

Referring to FIGS. 3A and 3B, when the electronic device 100 sets its orientation to either the first orientation (FIG. 3A) or the second orientation (FIG. 3B), it may configure itself to operate according to that orientation. Examples include: (1) orienting the UI and any content on the display screen 105 so that UI and content is always "right side up" from the user's point of view—i.e., the top of the UI or content is at the top end 118 in the first orientation and at the bottom end 120 in the second orientation; (2) using the first speaker 117A as the active earpiece and the second microphone 103B as the active microphone in the first orientation; (3) using the second speaker 117B as the active earpiece and the first microphone 103A as the active microphone in the second orientation; (4) using the first speaker 117A as the loudspeaker in the first orientation and the second speaker 117B as the loudspeaker in the second orientation; (5) making the "volume up" function of the volume control be the direction of the top end 118 in the first orientation and the direction of the bottom end 120 in the second orientation (e.g., increasing the volume when the user presses the rocker control toward the top end 118 and the bottom end 120, respectively); (6) assigning the roles of main antenna and diversity antenna to the first antenna 217A and the second antenna 217B, respectively, in the first orientation; and (7) assigning the roles of main antenna and diversity antenna to the second antenna 217B and the first antenna 217A, respectively, in the second orientation.

Referring back to FIG. 1B, according to an embodiment, the electronic device 100 freezes its orientation while the user's finger remains on the FPR 106. In doing so, the electronic device 100 may override the movement data provided by the accelerometer 202 (FIG. 2). For example, if the user is lying on the couch viewing content on the display 105 and then stands up, the data from the accelerometer 202 will tend to fluctuate, thereby prompting the electronic device 100 to shift quickly from orientation to orientation and, consequently, flipping the orientation of the displayed content back and forth. This frustrating behavior is well-known among smartphone users. In this embodiment, however, the electronic device freezes the orientation (e.g., stays in the first orientation or the second orientation) in spite of the fluctuating accelerometer data until the user removes his or her finger from the FPR 106.

Figure 5:
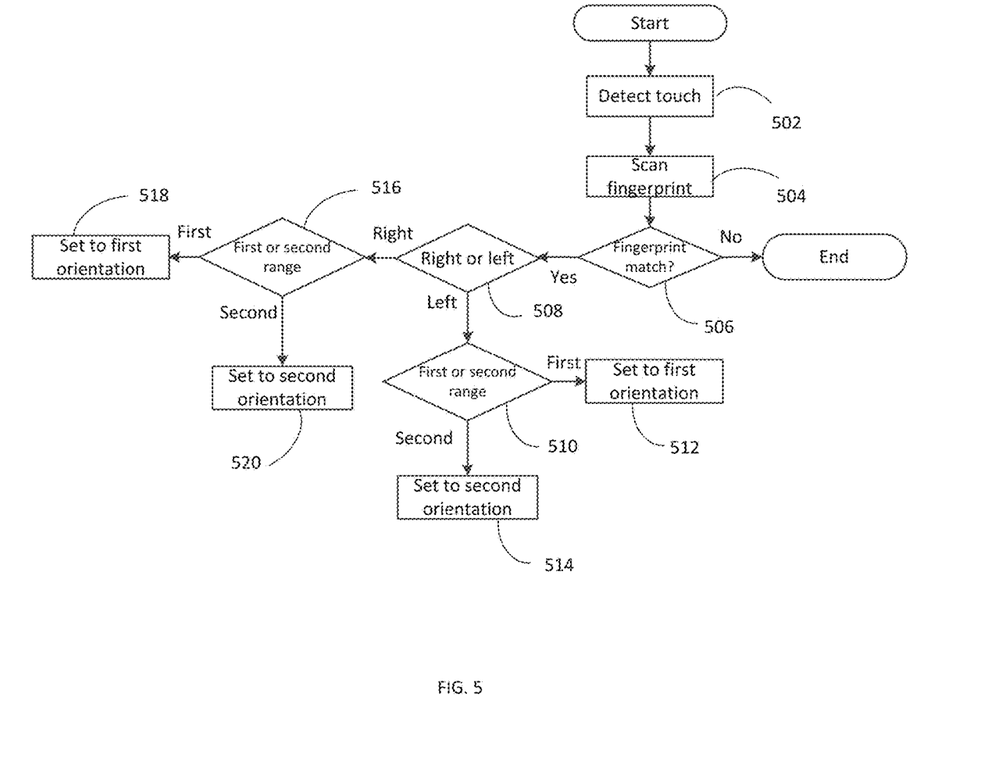
FIG. 5 is a flowchart showing the operation of the electronic device according to an embodiment.

Turning to FIG. 5, the electronic device 100 (FIG. 1B) carries out the procedure depicted in the flowchart in an embodiment. At 502, the FPR 106 (FIG. 1B) (or other sensor) detects a touch by the user's finger. At 504, the FPR 106 scans the fingerprint of the user's finger. At 506, the FPR 106 determines whether the fingerprint matches any of the fingerprints stored in its memory.

There are many possible variations on the sequence of events that occur in 502, 504, and 506, and many possible variations of which devices is involved in the events. The electronic device 100 may, for example, be in a low power sleep mode with only the sensor hub 224 (FIG. 2) being awake. The FPR 106 (FIG. 1B) could also be on and be waiting for physical contact. The FPR 106 may not necessarily keep scanning for a fingerprint, but may instead be in a low power mode, looking only for a capacitive touch. In that case, the FPR 106 would wake up upon detecting a capacitive touch, and then carry out a fingerprint scan. Additionally, the FPR 106 could be woken up by movement or by the user taking the electronic device 100 out of the user's pocket (detected by the proximity sensors 104A and 104B of FIG. 1B).

Referring still to FIG. 5, if the FPR 106 (FIG. 1B) does not find a fingerprint match, the procedure ends. If it finds a match, then at 508 the FPR 106 determines whether the fingerprint is from the user's left hand or right hand. If the fingerprint is determined to be from the user's left hand, then at 510, the FPR 106 determines whether the angle of the fingerprint falls into a first range of angles (e.g., as shown in FIG. 4A) or a second range of angles (e.g., as shown in FIG. 4B). The FPR 106 provides the right hand/left hand information and the first/second angle range information to the sensor hub 224 (FIG. 2), which passes the information to the application processor 203 (FIG. 2). If the angle of the fingerprint falls into the first range of angles, then at 512 the application processor 203 sets the orientation of the electronic device 100 to the first orientation (FIG. 3A). If the angle of the fingerprint falls into the second range of angles, then at 514 the application processor 203 sets the orientation of the electronic device 100 to the second orientation (FIG. 3B).

If the fingerprint is determined to be from the user's right hand, then at 516 the FPR 106 determines whether the angle of the fingerprint falls into a first range of angles (e.g., as shown in FIG. 4C) or a second range of angles (e.g., as shown in FIG. 4D), and provides the right hand/left hand information and the first/second angle range information to the sensor hub 224 (FIG. 2), which passes the information to the application processor 203 (FIG. 2). If the angle of the fingerprint falls into the first range of angles, then, at 518, the application processor 203 sets the orientation of the electronic device 100 to the first orientation (FIG. 3A). If the angle of the fingerprint falls into the second range of angles, then, at 520, the application processor 203 sets the orientation of the electronic device 100 to the second orientation (FIG. 3B).

Figure 6:
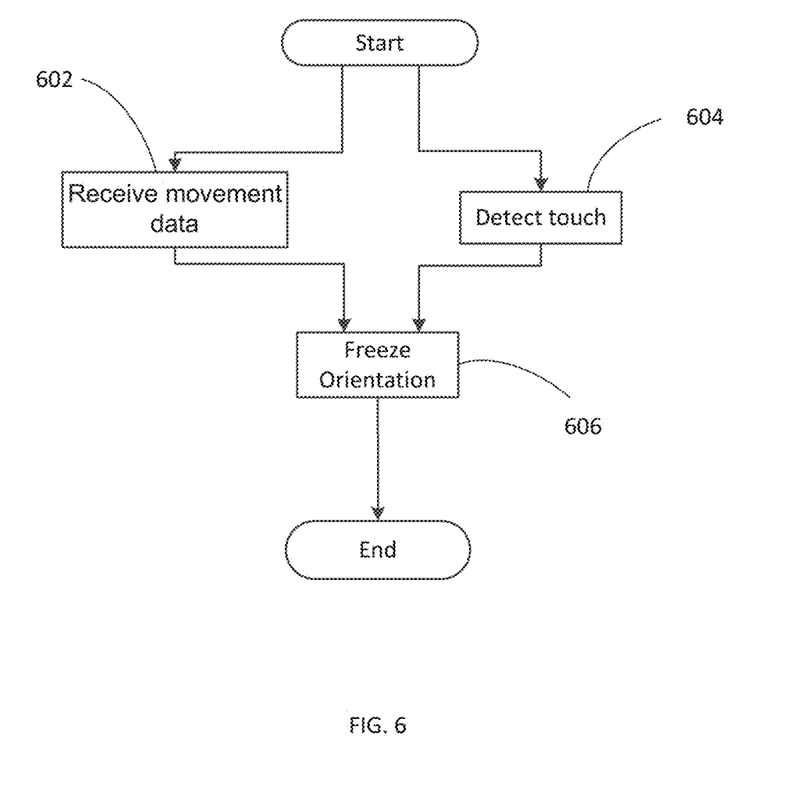
FIG. 6 is a flowchart showing the operation of the electronic device according to an embodiment.

Turning to FIG. 6, the electronic device 100 carries out the procedure depicted in the flowchart in an embodiment. Prior to the procedure, the electronic device 100 will have already set its orientation to either the first or the second orientation ("the current orientation"), either based on data from the accelerometer 202 or based on data from the FPR 106. At 602, the application processor 203 receives movement data from sensor hub 224 (which received it from the accelerometer 202) indicating that the accelerometer 202 has detected motion. At 604, executed concurrently with 602 or prior to 602, the FPR 106 sends data to the sensor hub 224 indicating that it currently detects the user's touch, which the sensor hub provides to the application processor 203. The FPR 106 and application processor 203 may also execute, or have previously executed the procedure of FIG. 5, and the data passed on to the application processor 203 at 604 may also include the right hand/left hand and first range/second range status. At 606, the application processor 203 disregards the data from the accelerometer and maintains (i.e., freezes or anchors) the orientation of the electronic device 100 in whatever state it was prior to the process of FIG. 6. Alternatively, at 606, the application processor 203 overrides the accelerometer 202 and changes the orientation of the electronic device 100 to the first or to the second orientation—i.e., reorients the electronic device 100.

Examples of freezing the orientation of the electronic device 100 or reorienting the electronic device 100 include freezing or reorienting one or more of the electronic device 100's earpiece assignment, microphone assignment, speaker assignment, volume control direction, and main and diversity antenna assignment.

It can be seen from the foregoing that an electronic device with a fingerprint reader and method for operating the same has been provided. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

What is claimed is:

1. A method comprising:
receiving, by one or more processors, an indication of a contact of a finger of a user with a sensor;
determining, by the one or more processors, a fingerprint associated with the finger of the user;
determining, by the one or more processors, whether the fingerprint associated with the finger is from a left hand or from a right hand of the user;
determining, by the one or more processors, whether an angle of the fingerprint with respect to the sensor falls within a first range of angles or within a second ranges of angles that does not overlap with the first range of angles;
determining, by the one or more processors, based on whether the fingerprint associated with the finger is from the left hand of the user or from the right hand of the user, and further based on whether the angle falls within the first range of angles or within the second range of angles, an orientation of an electronic device relative to the user;
determining, by the one or more processors, based on the orientation of the electronic device relative to the user, a configuration of one or more components of the electronic device;
configuring, by the one or more processors, and based on the determined configuration, the one or more components of the electronic device for use during operation of the electronic device; and
maintaining, by the one or more processors, based on the fingerprint and on the angle of the fingerprint with respect to the sensor, the configuration of the one or more components of the electronic device at least until the contact of the finger with the sensor ceases.

2. The method of claim 1, further comprising:
responsive to receiving information associated with a motion of the electronic device, disregarding the information associated with the motion of the electronic device to maintain the
a sensor that is configured to detect a contact of a finger of a user;
one or more components;
one or more processors; and
a memory configured to store instructions that, when executed by the one or more processors, cause the one or more processors to:
receive an indication of the contact of the finger with the sensor;
receive an indication of a fingerprint associated with the finger;
determine whether the fingerprint associated with the finger is from a left hand or from a right hand of the user;
determine whether an angle of the fingerprint with respect to the sensor falls within a first range of angles or within a second ranges of angles that does not overlap with the first range of angles;
determine, based on whether the fingerprint associated with the finger is from the left hand of the user or from the right hand of the user, and further based on whether the angle falls within the first range of angles or within the second range of angles, an orientation of the electronic device relative to the user; configuration of the one or more components of the electronic device until the contact of the finger with the sensor ceases.

3. The method of claim 1, further comprising:
authenticating the user based on the fingerprint,
wherein configuring the one or more components of the electronic devices occurs after authenticating the user.

4. The method of claim 1, wherein determining the configuration of the one or more components of the electronic device comprises determining one or more of a display orientation of a display of the electronic device, an earpiece assignment of one or more earpieces associated with the electronic device, a microphone assignment of one or more microphones of the electronic device, or a speaker assignment of one or more speakers of the electronic device.

5. The method of claim 1, wherein determining the configuration of the one or more components of the electronic device comprises:
responsive to determining that the angle falls within the first range of angles, determining a first display orientation of a display of the electronic device; and
responsive to determining that the angle falls within the second range of angles, determining a second display orientation of the display of the electronic device.

6. The method of claim 1, wherein determining the configuration of the one or more components of the electronic device comprises:
responsive to determining that the fingerprint is associated with the left hand and that the angle falls within the first range of angles, determining a first display orientation of a display of the electronic device;
responsive to determining that the fingerprint is associated with the left hand and that the angle falls within the second range of angles, determining a second display orientation of the display of the electronic device;
responsive to determining that the fingerprint is associated with the right hand and that the angle falls within the first range of angles, determining a third display orientation of the display of the electronic device; and
responsive to determining that the fingerprint is associated with the right hand and that the angle falls within the second range of angles, determining a fourth display orientation of the display of the electronic device.

7. The method of claim 1, wherein determining the configuration of the one or more components of the electronic device comprises identifying a main antenna of the electronic device and a diversity antenna of the electronic device.

8. The method of claim 1, wherein configuring the one or more components of the electronic device comprises engaging one or more proximity sensors of the electronic device.

9. An electronic device, comprising:
determine, based on the orientation of the electronic device relative to the user, a configuration of the one or more components of the electronic device;
configure, based on the determined configuration, the one or more components of the electronic device for use during operation of the electronic device;
maintain, based on the fingerprint and on the angle of the fingerprint with respect to the sensor, the configuration of the one or more components of the electronic device at least until the contact of the finger with the sensor ceases.

10. The electronic device of claim 9, wherein the instructions stored by the memory further cause the one or more processors to:
responsive to receiving information associated with a motion of the electronic device, disregard the information associated with the motion of the electronic device to maintain the configuration of the one or more components of the electronic device until the contact of the finger with the sensor ceases.

11. The electronic device of claim 9,
wherein the instructions stored by the memory further cause the one or more processors to authenticate the user based on the fingerprint, and
wherein the instructions stored by the memory cause the one or more processors to configure the one or more components of the electronic devices after authenticating the user.

12. The electronic device of claim 9,
wherein the one or more components comprise one or more of a display, one or more earpieces, one or more microphones, or one or more speakers, and
wherein the instructions stored by the memory that cause the one or more processors to determine the configuration of the one or more components cause the one or more processors to determine one or more of a display orientation of the display, an earpiece assignment of the one or more earpieces, a microphone assignment of the one or more microphones, or a speaker assignment of the one or more speakers.

13. The electronic device of claim 9, further comprising a display, and wherein the instructions stored by the memory that cause the one or more processors to determine the configuration of the one or more components cause the one or more processors to:
responsive to determining that the angle falls within the first range of angles, determine a first display orientation of the display; and
responsive to determining that the angle falls within the second range of angles, determine a second display orientation of the display.

14. The electronic device of claim 9, further comprising a display, and wherein the instructions stored by the memory that cause the one or more processors to determine the configuration of the one or more components cause the one or more processors to:
responsive to determining that the fingerprint is associated with the left hand and that the angle falls within the first range of angles, determine a first display orientation of the display;
responsive to determining that the fingerprint is associated with the left hand and that the angle falls within the second range of angles, determine a second display orientation of the display;
responsive to determining that the fingerprint is associated with the right hand and that the angle falls within the first range of angles, determine a third display orientation of the display; and
responsive to determining that the fingerprint is associated with the right hand and that the angle falls within the second range of angles, determine a fourth display orientation of the display.

15. The electronic device of claim 9, wherein the instructions stored by the memory that cause the one or more processors to determine the configuration of the one or more components cause the one or more processors to identify a main antenna of the electronic device and a diversity antenna of the electronic device.

16. The electronic device of claim 9, further comprising one or more proximity sensors, and wherein the instructions stored by the memory that cause the one or more processors to configure the one or more components cause the one or more processors to engage the one or more proximity sensors.

\* \* \* \* \*

UNITED STATES PATENT AND TRADEMARK OFFICE
CERTIFICATE OF CORRECTION

Page 1 of 2

PATENT NO. : 9,740,909 B2
APPLICATION NO. : 15/368785
DATED : August 22, 2017
INVENTOR(S) : Pierce et al.

It is certified that error appears in the above-identified patent and that said Letters Patent is hereby corrected as shown below:

Column 7, Line 42-Column 8, Line 6 (Claim 2): Replace "The method of claim 1, further comprising: responsive to receiving information associated with a motion of the electronic device, disregarding the information associated with the motion of the electronic device to maintain the a sensor that is configured to detect a contact of a finger of a user; one or more components; one or more processors; and a memory configured to store instructions that, when executed by the one or more processors, cause the one or more processors to: receive an indication of the contact of the finger with the sensor; receive an indication of a fingerprint associated with the finger; determine whether the fingerprint associated with the finger is from a left hand or from a right hand of the user; determine whether an angle of the fingerprint with respect to the sensor falls within a first range of angles or within a second ranges of angles that does not overlap with the first range of angles; determine, based on whether the fingerprint associated with the finger is from the left hand of the user or from the right hand of the user, and further based on whether the angle falls within the first range of angles or within the second range of angles, an orientation of the electronic device relative to the user; configuration of the one or more components of the electronic device until the contact of the finger with the sensor ceases."

With --The method of claim 1, further comprising: responsive to receiving information associated with a motion of the electronic device, disregarding the information associated with the motion of the electric device to maintain the configuration of the one or more components of the electronic device until the contact of the finger with the sensor ceases.--

Column 8, Lines 56-67 (Claim 9): Replace "An electronic device, comprising:
determine, based on the orientation of the electronic device relative to the user, a configuration of the one or more components of the electronic device;
configure, based on the determined configuration, the one or more components of the electronic device for use during operation of the electronic device;
maintain, based on the fingerprint and on the angle of the fingerprint with respect to the sensor, the configuration of the one or more components of the electronic device at least until the contact of the finger with the sensor ceases."

With --An electronic device, comprising:

Signed and Sealed this
Second Day of October, 2018

Andrei Iancu
*Director of the United States Patent and Trademark Office* a sensor that is configured to detect a contact of a finger of a user;
one or more components;
one or more processors; and
a memory configured to store instructions that, when executed by the one or more processors, cause the one or more processors to:
receive an indication of the contact of the finger with the sensor;
receive an indication of a fingerprint associated with the finger;
determine whether the fingerprint associated with the finger is from a left hand or from a right hand of the user;
determine whether an angle of the fingerprint with respect to the sensor falls within a first range of angles or within a second range of angles that does not overlap with the first range of angles;
determine, based on whether the fingerprint associated with the finger is from the left hand of the user or from the right hand of the user, and further based on whether the angle falls within the first range of angles or within the second range of angles, an orientation of the electronic device relative to the user;
determine, based on the orientation of the electronic device relative to the user, a configuration of the one or more components of the electronic device;
configure, based on the determined configuration, the one or more components of the electronic device for use during operation of the electronic device; and
maintain, based on the fingerprint and on the angle of the fingerprint with respect to the sensor, the configuration of the one or more components of the electronic device at least until the contact of the finger with the sensor ceases.--